2,946,758

ANION EXCHANGE RESINS FROM ESTERS OF ACRYLIC ACIDS WITH POLYHYDROXY SUBSTITUTED QUATERNARY AMMONIUM SALTS

Henryk Zenftman, West Kilbride, Scotland, assignor to Imperial Chemical Industries Limited, London, England, a corporation of Great Britain No Drawing. Filed Sept. 7, 1956, Ser. No. 608,429

Claims priority, application Great Britain Oct. 7, 1955

4 Claims. (Cl. 260—2.1)

The present invention is concerned with new anion exchange resins and their production.

An anion exchange resin according to the present invention consists of a polymeric ester made up at least substantially of units which contain at least one quaternary ammonium group connected to not less than two acyloxy groups each derived from acrylic or methacrylic acid.

Examples of said anion exchange resins are the polymeric esters of NN'-dimethyl NN'-di(2-methacryloyloxyethyl) piperazinium di(monomethyl sulphate), of NN-dimethyl NN-di(2-methacryloyloxyethyl) ammonium monomethyl sulphate, of N-methyl NNN-tri(2-methacryoyloxyethyl) ammonium monomethyl sulphate.

According to the present invention the preferred process for the production of said anion exchange resin comprises polymerising an ester-salt containing at least one quaternary ammonium group connected to not less than two acyloxy groups each derived from acrylic or methacrylic acid.

Said ester-salt, which is in fact a quaternary ammonium ester-salt, is produced for instance by forming a tertiary-amino ester by ester interchange between at least 2 mols. of an ester of acrylic or methacrylic acid, for example a methyl or ethyl ester of acrylic or methacrylic acid, and 1 mol. of a polyhydric tertiary-amino alcohol and treating the resulting tertiary-amino ester with a methylating agent, i.e. an alkyl ester of an inorganic acid as for instance a dialkyl sulphate or an alkyl halide.

The polyhydric tertiary-amino alcohols are for example methylamine-NN-diethanol, 1:4-piperazine dimethanol, 1:4-piperazine diethanol, ethylamine NN-diethanol, methylamine NN-dipropanol, triethanolamine, and ethylenediamine NNN'N'-tetraethanol.

These polyhydric tertiary-amino alcohols after their conversion into said tertiary-amino esters of acrylic or methacrylic acid are converted into the corresponding quaternary ammonium ester-salts by reacting them with for instance an alkyl ester of an inorganic acid in the presence of a polymerisation inhibitor as for example 1:4-dimethyl 6-tertiary-butylphenol. Said alkyl ester of an inorganic acid may be for instance dimethyl or diethyl sulphate or ethyl, methyl or propyl chloride, bromide or iodide.

Said alkyl ester of an inorganic acid is preferably introduced into a solution of the tertiary-amino ester which solution should preferably contain the polymerisation inhibitor and be at a reaction temperature until the reaction is complete. The phase containing the resulting ester-salt is separated from the diluent phase and is washed with an organic solvent for the inhibitor until the inhibitor is removed. The thus purified ester-salt is then polymerised, preferably in the presence of water, and if desired in suspension in a water-immiscible liquid boiling at a temperature above 70° C., in the presence of a catalyst of the kind used for polymerising acrylic or methacrylic esters or acrylic and methacrylic acids. These catalysts may be for instance ammonium persulphate, potassium persulphate, azodiisobutyronitrile or benzoyl peroxide. The resulting product, depending on the conditions of polymerisation, may be in the form of irregular granules or regular spherical beads and may be separated by filtration or washed free from diluent by displacement with water and subsequently dried.

Alternatively the ester-salt may be polymerised in bulk in the absence of a diluent and thereafter broken up or it may be polymerised in any desired shape as for example as sheet or foil or if desired supported on a carrier of porous or felted or woven fibre of material resistant to dilute acids and alkalis. For this purpose glass or polyethylene terephthalate fabrics are very suitable.

An alternative process for the production of an anion exchange resin according to the invention comprises polymerising a tertiary-amino ester of acrylic or methacrylic acid and treating the resulting polymerisation product with an alkyl ester of an inorganic acid to convert said polymerised product into a polymeric ester made up at least substantially of units which contain at least one quaternary ammonium group connected to not less than two acyloxy groups each derived from acrylic or methacrylic acid.

The tertiary-amino esters of acrylic or methacrylic acid are preferably washed free from polymerisation inhibitor with ether before their polymerisation is effected. The tertiary-amino ester of acrylic or methacrylic acid may be polymerised as such or as a suspension in an aqueous medium. The polymerisation is preferably carried out at raised temperature in the presence of a polymerisation catalyst of the kind aforementioned. If water has been included this is removed prior to the treatment with an alkyl ester of an inorganic acid as this treatment is to be carried out on the dry polymer and at raised temperature preferably in the presence of an organic diluent.

If it is desired to obtain the resins of the invention in their basic form they are treated with a solution of an alkali metal hydroxide and washed with water until the wash water is substantially neutral.

The anion exchange resins according to the invention in their basic form are bases which are insoluble in water or any of the usual industrial solvents. They are stable to prolonged exposure to hot water. They are of high gravimetric and volumetric anion exchange capacity.

If desired the swelling and other physical properties of the resin of the invention may be modified by carrying out the polymerisation step in the presence of a minor proportion of suitably reactive monomers other than said ester-salts, such as methacrylic esters, but the extent to which this may usefully be done is limited.

The resins of the invention after use require less caustic soda to regenerate them into their basic form than commercially available anion exchange resins containing quaternary ammonium groups.

The following examples illustrate how anion exchange resins according to the invention can be prepared. Parts are parts by weight.

EXAMPLE 1

*Preparation of an anion exchange resin based on the polymeric ester of NN'-dimethyl NN'-di(2-methacryloyloxyethyl) piperazinium di(monomethyl sulphate)*

In a vessel provided with a stirrer and fractionating column 34.8 parts piperazine diethanol, M.P. 134° C., is suspended in a mixture of 80 parts benzene, 54 parts methyl methacrylate and 6 parts 2:4-dimethyl 6-tertiary-butylphenol and the mixture is heated until boiling point is reached. 0.1 part of sodium hydroxide dissolved in 3 parts methanol are added gradually to the mixture, and the methanol produced during the ester interchange reaction is distilled off in the form of the benzene-methanol azeotrope, B.P. 58° C. With the progress of the reaction the piperazine diethanol crystals gradually dissolve in the reaction mixture. When the total amount of methanol produced during the reaction has been distilled off, which takes about 7 hours, the liquid is cooled, filtered to remove any traces of suspended impurities, and the benzene and the excess of methyl methacrylate are distilled off under reduced pressure. The oily residue containing the produced NN'-di(2-methacryloyloxyethyl) piperazine is now diluted with benzene. To the benzene solution 50 parts dimethyl sulphate are added gradually with stirring at a starting temperature of 50° C. The heat of reaction raises the temperature to the boiling point of benzene and the addition of dimethyl sulphate is continued while refluxing at that temperature. The addition of dimethyl sulphate is spread over about 30 minutes, after which time the stirring is continued for another 30 minutes with moderate heating of the reaction mixture to maintain the temperature at about 80° C. After cooling, the mixture is diluted with an equal volume of benzene, and a fairly thick slurry consisting of a suspension of fine crystals in benzene is obtained. This is washed several times with benzene and light petroleum ether to remove the 2:4-dimethyl 6-tertiary butylphenol, filtered and dried. The product consists substantially of crystalline NN'-dimethyl NN'-di(2-methacryloyloxyethyl) piperazinium di-(monomethyl sulphate).

One part ammonium persulphate, dissolved in 15 parts water, is added to 30 parts crystalline product and the whole is suspended in 200 parts toluene by means of mechanical stirring and heated for 3 hours at 90 to 95° C. A hard granular polymeric resin is obtained which is insoluble in any solvent. After washing with light petroleum ether and drying, it is treated with an excess of a 2% solution of sodium hydroxide and subsequently washed with distilled water until the wash-water ceases to colour phenolphthalein. Its absorption capacity for the chloride ions from hydrochloric acid is 2.6 milli-equivalents per gram. After six absorptions of chloride ion from hydrochloric acid and six regenerations with 2% sodium hydroxide solution, the resin does not show any reduction of its chloride ion absorption capacity.

EXAMPLE 2

*Preparation of an anion exchange resin based on the polymeric ester of NN-dimethyl NN-di(2-methacryloyloxyethyl)ammonium monomethyl sulphate*

A solution of 119 parts methyl diethanolamine, 300 parts methyl methacrylate and 30 parts 2:4-dimethyl 6-tertiary butylphenol in 600 parts benzene is heated in a vessel provided with a fractionating column. 0.5 part sodium hydroxide dissolved in 12 parts methanol is added gradually to the mixture. The rate of heating is adjusted in such a way as to maintain a steady condensation in the receiver of the benzene-methanol azeotrope containing the methanol resulting from the ester interchange reaction. After seven hours heating the azeotrope condensed contains 64 parts methanol. The reaction mixture is cooled, and the filtrate is stripped under reduced pressure from benzene and the excess methyl methacrylate. The oily residue is taken up in benzene. The benzene solution obtained contains N-methyl NN-di-(2-methacryloyloxyethyl)amine and 2:4-dimethyl 6-tertiary butylphenol. This solution is now treated with 120 parts dimethyl sulphate as described in Example 1. After completion of the reaction a thick oily layer separates at the bottom of the vessel. It is washed with benzene and then with petroleum ether having a boiling range of 80° to 100° C. A resinous product is obtained which consists substantially of NN-dimethyl NN-di(2-methacryloyloxyethyl)ammonium monomethyl sulphate.

100 parts of the product is diluted with 20 parts water in order to reduce its viscosity. One part azodiisobutyronitrile is added to the liquid and the mixture is heated with agitation with a mixture consisting of 150 parts petroleum ether having a boiling range of 80° to 100° C. and 150 parts carbon tetrachloride for 3 hours. The resulting granular suspension of resin is filtered and the organic solvent dried off, the resin is washed with water and treated with an aqueous solution of sodium hydroxide of 2.5% strength. The product is an anion exchange resin having a capacity towards hydrochloric acid of 2.7 milli-equivalents per gram and 2.4 milli-equivalents per cm. On wetting the dry resin with water its bulk volume is increased only by 14%.

EXAMPLE 3

*Preparation of an anion exchange resin based on the polymeric ester of N-methyl NNN-tri(2-methacryloyloxyethyl)ammonium monomethyl sulphate*

A mixture of 149 parts triethanolamine, 400 parts methyl methacrylate, 600 parts benzene and 40 parts 2:4-dimethyl 6-tertiary-butylphenol is heated with the addition of 0.9 part sodium hydroxide dissolved in 16 parts methanol under similar conditions to those described in Example 1. After 6 hours, the methanol content of the condensed azeotrope is about 110 grams. The reaction mixture is now cooled, filtered to remove any solid impurities, and the benzene and excess methyl methacrylate are stripped off. The oily residue consists substantially of the product tri(2-methacryloyloxyethyl)amine. It is again taken up in benzene, washed several times with water, dried by azeotropic distillation and treated with 120 parts dimethyl sulphate in a manner described in Example 1. The product of reaction, N-methyl NNN-tri(2-methacryloyloxyethyl)ammonium monomethyl sulphate forms a slightly opalescent liquid which, after dilution with an equal volume of benzene, separates into two layers. The oily lower layer is washed several times with benzene to remove the 2:4-dimethyl 6-tertiary-butylphenol and 4 parts ammonium persulphate are dissolved in it. The whole is now stirred for 3 hours at 90° to 95° C. in 500 parts xylene, and a hard granular resin is obtained. The resin is washed with light petroleum ether, dried at 50° to 60° C. and treated with an excess of a 2% solution of sodium hydroxide. The absorption capacity of the resin towards hydrochloric acid is 1.9 milli-equivalents per gram.

EXAMPLE 4

*Preparation of an anion exchange resin based on the polymeric ester of N-methyl NNN-tri(2-methacryloyloxyethyl)ammonium monomethyl sulphate*

The reaction is carried out as described in Example 3, except that the tri(2-methacryloyloxyethyl)amine produced is suspended in 500 parts water and stirred for 2 hours at 95° C. with 4 parts benzoyl peroxide polymerisation catalyst instead of being reacted with dimethyl sulphate. Hard, opaque, insoluble granules are obtained which are filtered off, washed and dried. The granular resin is suspended in 200 parts benzene and heated for 6 hours at 70° to 80° C. with 120 parts dimethyl sulphate. The resin is washed with light petroleum ether, dried, washed with water and treated with an excess of 2 parts sodium hydroxide solution. The absorption capacity of this resin towards hydrochloric acid is 2.5 milli-equivalents per gram.

EXAMPLE 5

70 parts of crystalline NN'-dimethyl NN'-di(2-methacryloyloxyethyl) piperazinium di(monomethyl sulphate) prepared as described in Example 1 are dissolved in 35 parts water and 5 parts glycerol. The somewhat cloudy mixture is dispersed by stirring in 550 parts toluene to which previously 0.5 part beeswax and 2.1 parts azodiisobutyronitrile are added. The suspension is heated to 100° C. during which the opaque droplets become clear and transparent. After 2 hours heating a solid resin is obtained in the form of spherical beads. The resin is washed with petroleum ether, dried, treated with a 1% solution of hydrochloric acid and then washed with 2.5% sodium hydroxide. The absorption capacity of the resin thus obtained for the chlorine ions of N/10 hydrochloric acid is 4.64 milli-equivalents per gram.

What I claim is:

1. A water-insoluble anion exchange resin which is a polymer of a monomer selected from the group consisting of the salts of esters, with at least two moles of a monomeric acid selected from the class consisting of acrylic acid and methacrylic acid, of a member of the class of alcoholic quaternary amine cations consisting of (1) N-alkyl, N-methyl-N,N-bis (β-hydroxy ethyl) ammonium, (2) N,N'-dialkyl-N,N'-bis (hydroxymethyl) piperazinium, (3) N,N'-dialkyl-N,N'-bis (β-hydroxyethyl) piperazinium, (4) N-alkyl-N-ethyl-N,N-bis (β-hydroxyethyl) ammonium, (5) N-alkyl-N-methyl-N,N-bis (γ-hydroxypropyl) ammonium, (6) N-alkyl-N,N,N tris (β-hydroxyethyl) ammonium and (7) N,N'-dialkyl,N,N,N',N' tetrakis (β-hydroxyethyl) ethylene diammonium, the salts being salts with anions selected from the group consisting of monomethyl sulfate, monoethyl sulfate, chloride, bromide and iodide, said polymers being manufactured by polymerization in the presence of a solvent for said monomer and a polymerization catalyst, and said alkyl groups having from one to three carbon atoms.

2. An anion exchange resin as claimed in claim 1 consisting of a polymeric ester of NN'-dimethyl NN'-di(2-methacryloyloxyethyl) piperazinium di(monomethyl sulphate).

3. An anion exchange resin as claimed in claim 1 consisting of a polymeric ester of a product consisting substantially of NN - dimethyl NN-di(2-methacryloyloxyethyl)ammonium monomethyl sulphate.

4. An anion exchange resin as claimed in claim 1 consisting of a polymeric ester of N-methyl NNN-tri(2-methacryloyloxyethyl)ammonium monomethyl sulphate.

References Cited in the file of this patent

UNITED STATES PATENTS

| | | |
|---|---|---|
| 2,138,762 | Harmon | Nov. 29, 1938 |
| 2,611,768 | Butler | Sept. 23, 1952 |
| 2,705,228 | Winberg | Mar. 29, 1955 |
| 2,741,568 | Hayek | Apr. 10, 1956 |

FOREIGN PATENTS

| | | |
|---|---|---|
| 747,272 | Germany | Sept. 18, 1944 |